(12) United States Patent
Murata et al.

(10) Patent No.: US 12,517,352 B2
(45) Date of Patent: Jan. 6, 2026

(54) VEHICLE DISPLAY DEVICE

(71) Applicant: Yazaki Corporation, Tokyo (JP)

(72) Inventors: Naohisa Murata, Shizuoka (JP); Takayuki Mizushima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 609 days.

(21) Appl. No.: 17/714,117

(22) Filed: Apr. 5, 2022

(65) Prior Publication Data

US 2022/0326519 A1    Oct. 13, 2022

(30) Foreign Application Priority Data

Apr. 7, 2021 (JP) ................................ 2021-065140
Jan. 24, 2022 (JP) ................................ 2022-008367

(51) Int. Cl.
*G02B 27/01* (2006.01)
*G02B 3/04* (2006.01)

(52) U.S. Cl.
CPC ............ *G02B 27/0101* (2013.01); *G02B 3/04* (2013.01); *G02B 2027/0118* (2013.01); *G02B 2027/0141* (2013.01)

(58) Field of Classification Search
CPC .... G02B 2027/0118; G02B 2027/0141; G02B 2027/0101; G02B 3/0037–0068; B60R 1/00
See application file for complete search history.

(56) References Cited

U.S. PATENT DOCUMENTS

| | | | |
|---|---|---|---|
| 6,343,862 B1* | 2/2002 | Sawai | G02B 3/0062 353/38 |
| 2012/0105808 A1 | 5/2012 | Feng et al. | |
| 2016/0116735 A1 | 4/2016 | Hayashi et al. | |
| 2018/0088255 A1* | 3/2018 | Sakai | G02B 27/48 |
| 2018/0217376 A1 | 8/2018 | Yagi et al. | |
| 2018/0348515 A1* | 12/2018 | Kuzuhara | B60K 35/00 |
| 2019/0049733 A1* | 2/2019 | Jiang | G02B 5/0263 |
| 2019/0072799 A1 | 3/2019 | Narushima | |
| 2019/0129171 A1* | 5/2019 | Narushima | G02B 27/0101 |
| 2019/0353906 A1* | 11/2019 | Gollier | G02B 5/3016 |
| 2019/0369392 A1 | 12/2019 | Matsuura et al. | |

(Continued)

FOREIGN PATENT DOCUMENTS

| | | |
|---|---|---|
| CN | 204114838 U | 1/2015 |
| CN | 205029905 U | 2/2016 |

(Continued)

*Primary Examiner* — Bumsuk Won
*Assistant Examiner* — Samanvitha Sridhar
(74) *Attorney, Agent, or Firm* — KENEALY VAIDYA LLP (57) ABSTRACT

A vehicle display device includes one light source, a display device that emits display light by light incident from the light source, a first lens causing the light incident from the light source to be polarized toward the display device, and a second lens arranged between the first lens and the display device and distributing the light polarized through the first lens toward the display device. An emitting surface of the first lens is formed of one convex curved surface corresponding to the one light source. An emitting surface of the second lens is formed in a convex shape to be curved toward the display device side, and includes a plurality of curved microlens surfaces.

4 Claims, 7 Drawing Sheets

(56) References Cited

U.S. PATENT DOCUMENTS

2020/0089059 A1    3/2020  Nakamura
2020/0201047 A1*   6/2020  Nakamura ........... G02B 6/0055

FOREIGN PATENT DOCUMENTS

| | | |
|---|---|---|
| CN | 109459853 A | 3/2019 |
| EP | 3575846 A1 | 12/2019 |
| JP | 2018-120807 A | 8/2018 |
| WO | 2017/102443 A1 | 6/2017 |
| WO | 2018/225438 A1 | 12/2018 |

* cited by examiner

VEHICLE DISPLAY DEVICE

CROSS-REFERENCE TO RELATED APPLICATION(S)

The present application claims priority to and incorporates by reference the entire contents of Japanese Patent Application No. 2021-065140 filed in Japan on Apr. 7, 2021 and Japanese Patent Application No. 2022-008367 filed in Japan on Jan. 24, 2022.

BACKGROUND OF THE INVENTION

1. Field of the Invention

The present invention relates to a vehicle display device.

2. Description of the Related Art

Some vehicles are equipped with a vehicle display device that displays a virtual image of information provided to a driver in the vehicle interior. This vehicle display device is a so-called head-up display device including a plurality of light emitting elements mounted on a substrate and arranged at intervals, and a display device that emits a display image as display light, which is projected on a projected member such as a windshield or a combiner (for example, Japanese Patent Application Laid-open No. 2018-120807).

Regarding the vehicle display device in the related art, since the entire display area of the display device is irradiated with light from a light source, a polarizing lens is disposed according to the size of the display area. Although the polarizing lens is functionally formed to include an emitting surface of the polarizing lens, which is formed in a convex shape to be curved, the polarizing lens includes a plurality of convex portions (mountain portions) formed according to the light emitting elements, and also includes a concave portion (valley portion) formed between a plurality of mountain portions, that is, at a boundary between the mountain portions.

Regarding the vehicle display device in the related art, there is a case in which light emitted from the light source and incident onto the polarizing lens is reflected at the valley portion, so that loss of the light transmitting through the polarizing lens occurs. Therefore, the amount of light that transmits through the valley portion decreases as compared with the amount of light that transmits through the mountain portion of the polarizing lens, and the brightness is changed. Thus, there is room for improvement in terms of the visibility of a virtual image for the driver.

SUMMARY OF THE INVENTION

The present invention has been made in view of the above problem, and an object of the present invention is to provide a vehicle display device capable of improving the visibility of a virtual image displayed on a front field of a driver.

In order to achieve the above mentioned object, a vehicle display device according to one aspect of the present invention includes one light source; a display device that emits, as display light, a display image projected on a projected member provided on a vehicle by light incident from the light source; a first lens arranged on an optical path between the light source and the display device, and causing the light incident from the light source to be polarized toward the display device; and a second lens arranged between the first lens and the display device on the optical path, and distributing the light polarized through the first lens toward the display device, wherein the first lens includes an emitting surface that emits light toward the display device, the emitting surface of the first lens is formed of one convex curved surface corresponding to the one light source, the second lens includes: an incident surface onto which the light polarized through the first lens is incident; and an emitting surface which is formed in a convex shape to be curved toward the display device side and through which the light incident on and transmitting through the incident surface is emitted, and the emitting surface of the second lens includes a plurality of curved microlens surfaces arranged.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a vehicle display device according to the present invention will be described in detail with reference to the drawings. The present invention is not limited to the present embodiment. The components in the embodiment described below include components that can be easily assumed by those skilled in the art, or components that are substantially the same. Various omissions, replacements, or changes of the components in the embodiment described below can be made without departing from the gist of the invention.

Embodiment

Figure 1:
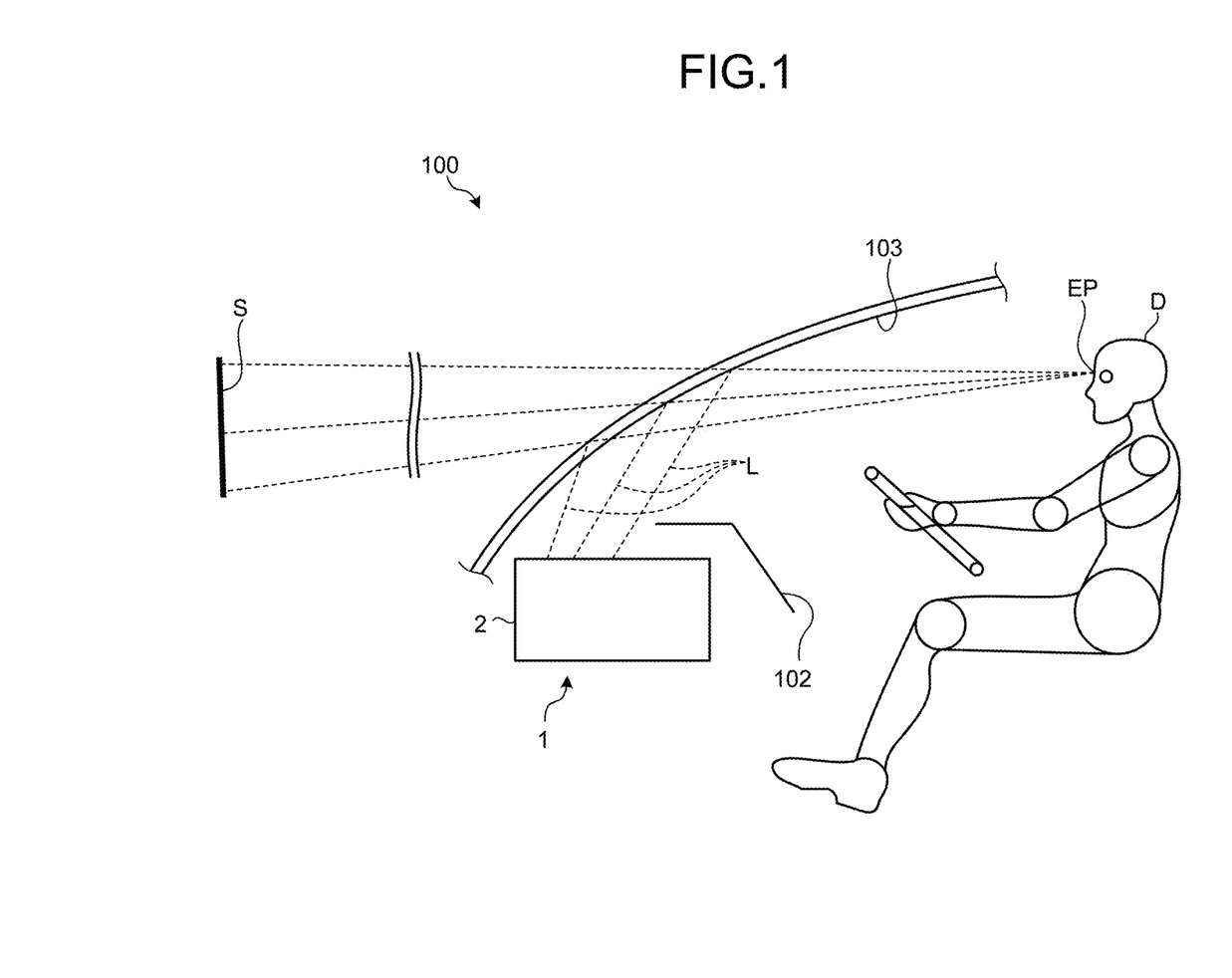
FIG. 1 is a schematic diagram illustrating a schematic configuration of a vehicle on which a vehicle display device according to an embodiment is mounted.
Figure 2:
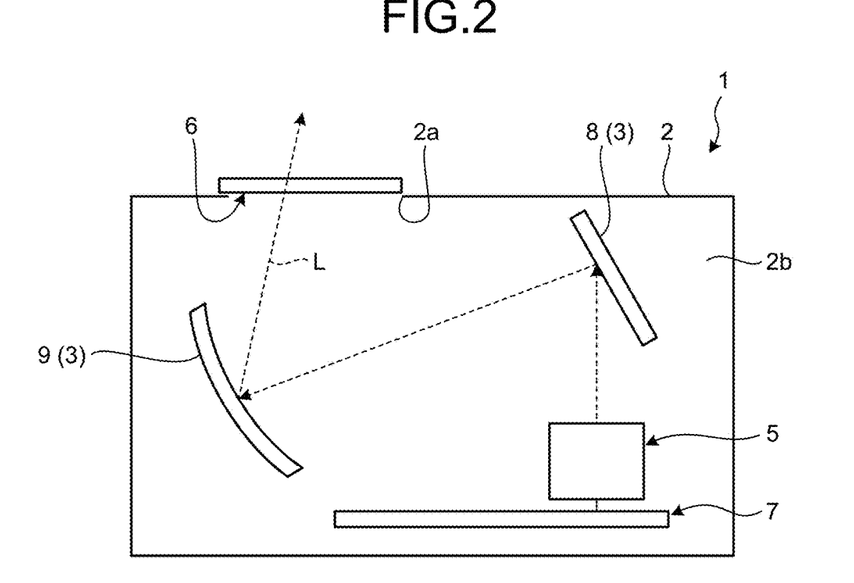
FIG. 2 is a schematic diagram illustrating a schematic configuration of the vehicle display device according to the embodiment.

As illustrated in FIG. 1, a vehicle display device 1 is, for example, a head-up display device mounted on a vehicle 100 such as an automobile. In the vehicle 100, the vehicle display device 1 is arranged inside an instrument panel 102, and projects a display image on a windshield 103 that is a projected member. The windshield 103 has semi-transmissive properties of reflecting part of incident light and transmitting the remaining part. Therefore, the windshield 103 reflects display light L emitted from the vehicle display device 1 toward an eye point EP of a driver D as a display image while transmitting a foreground of the vehicle 100. The driver D recognizes the display image reflected by the windshield 103 as a virtual image S. The virtual image S is recognized forward of the windshield 103 with respect to the driver D. As illustrated in FIG. 2, the vehicle display device 1 of the present embodiment includes a housing 2, two reflecting mirrors 3, a backlight unit 5, and a controller 7.

The housing 2 is formed of, for example, a synthetic resin or the like, and fixed to a vehicle body (not illustrated). As illustrated in FIG. 2, the backlight unit 5, the two reflecting mirrors 3, and the controller 7 are housed in an internal space 2b of the housing 2 and supported by the housing 2. The housing 2 includes an opening 2a through which the outside of the housing 2 and the internal space 2b communicate with each other. The opening 2a is provided in the housing 2 at a position facing the windshield 103, and is blocked with a transparent cover 6. The transparent cover 6 transmits the display light L that is emitted from the backlight unit 5 and reflected by the two reflecting mirrors 3. The display light L transmitted through the transparent cover 6 travels toward the windshield 103.

As illustrated in FIG. 2, the two reflecting mirrors 3 are arranged on an optical path of the display light L from the backlight unit 5 to the windshield 103, and reflect the display light L emitted from the backlight unit 5 toward the windshield 103. The two reflecting mirrors 3 are composed of a plane mirror 8 and a concave mirror 9.

The plane mirror 8 has a reflecting surface formed to be planar and is arranged at a position facing the backlight unit 5. The plane mirror 8 totally reflects, on the reflecting surface, the display light L emitted from the backlight unit 5 toward the concave mirror 9.

The concave mirror 9 has a reflecting surface formed to be a concave curved surface and is arranged at a position facing the plane mirror 8. The concave mirror 9 totally reflects the display light L reflected by the plane mirror 8 toward the windshield 103 via the transparent cover 6. The concave mirror 9 functions as, for example, a magnifying mirror. The concave mirror 9 reflects the display image to be enlarged so that the display image displayed by the display light L after being reflected by the concave mirror 9 is relatively enlarged as compared to the display image displayed by the display light L before being reflected by the concave mirror 9.

The backlight unit 5 emits the display image projected on the windshield 103 as the display light L. The backlight unit 5 includes a cylindrical housing 10, a display device 11, a light source 12, a light source substrate 13, a first lens 14, and a second lens 15.

The cylindrical housing 10 is formed of, for example, synthetic resin or the like in a box shape, and supports each of the display device 11 and the second lens 15 along an optical axis direction. Both ends of the cylindrical housing 10 are open in the optical axis direction, one opening is blocked by the light source substrate 13, and the other opening is blocked by the display device 11.

The display device 11 emits the display image projected on the windshield 103 by the light incident from the light source 12, as the display light L. The display device 11 is a so-called liquid crystal panel, and is formed of, for example, a light transmissive type or a light semi-transmissive type thin film transistor (TFT) liquid crystal display or the like. The display device 11 has a display area 11a including a plurality of pixels. In the display area 11a, the plurality of pixels are arranged in a matrix. The display device 11 displays a display image including numbers, characters, figures, and the like according to a control signal of the controller 7, for example. The display area 11a is an area where the display image is displayed. The display device 11 is arranged on the optical path of the light emitted from the light source 12, and illuminated from the light source 12 side, so that a display surface opposite to the light source 12 in the optical axis direction emits light.

The light source 12 illuminates the display device 11. The light source 12 is composed of, for example, one light emitting element mounted on the light source substrate 13. The light emitting element is, for example, a light emitting diode (LED). In addition, the light source 12 includes that the light emitting elements are collectively mounted on the light source substrate 13 of the first lens 14 at a position where an optical axis of the first lens 14 passes through when viewed from the optical axis direction. In this case, as illustrated in, for example, FIGS. 3, 4A, and 4B, one light source 12 is composed of three LEDs 16 that are collectively mounted on the light source substrate 13 at a position where the optical axis of the first lens 14 passes through. The three LEDs 16 are arranged in a row with respect to the light source substrate 13 in a direction orthogonal to a light source direction. For example, the light source 12 is turned on by a power source mounted on the vehicle 100, for example, electric power obtained from a battery (not illustrated) or the like. The number of the LEDs 16 is not limited to three. The arrangement of the plurality of LEDs 16 is not limited to one row, and may be arranged in an annular shape or a polygonal shape as long as the arrangement can be recognized as one light source.

The light source substrate 13 is formed in a rectangular shape when viewed from the light source direction. A plurality of the LEDs 16 that function as the light source 12 and a plurality of electronic components are mounted on a so-called mounting surface of the light source substrate 13. On the other hand, for example, a heat sink (not illustrated) is fixed to a surface opposite to the mounting surface of the light source substrate 13. The heat generated from the light source 12 is stored in the light source substrate 13. The heat sink releases the heat stored in the light source substrate 13 to the outside of the backlight unit 5.

Figure 3:
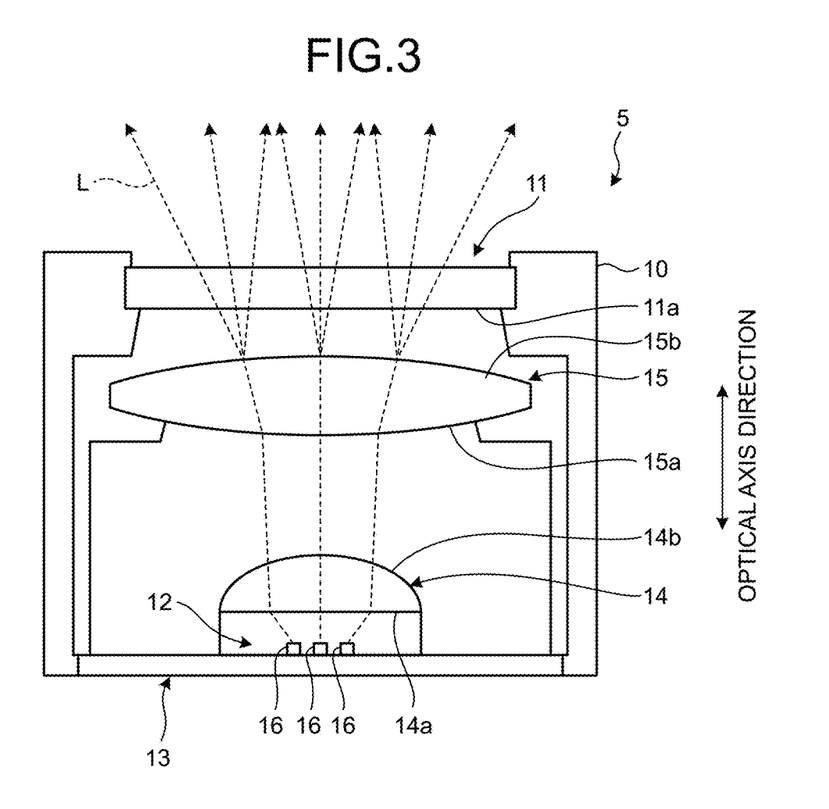
FIG. 3 is a schematic diagram illustrating a schematic configuration of a backlight unit according to the embodiment.
Figure 4A:
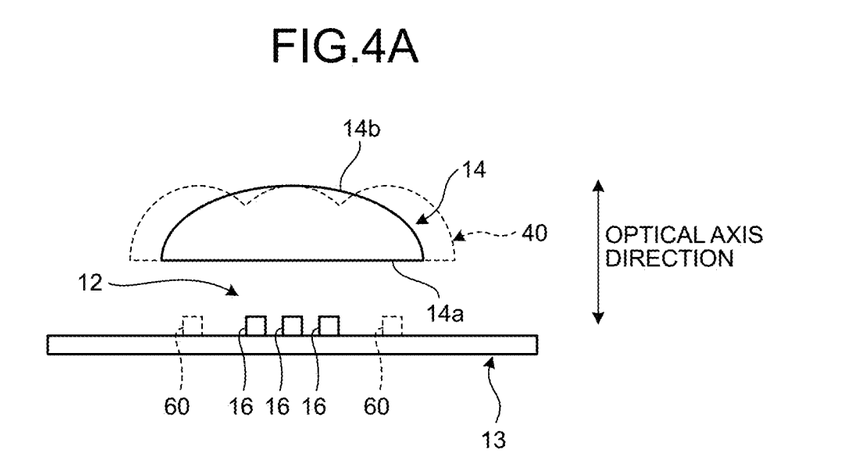
FIG. 4A is a schematic diagram illustrating a schematic configuration of a light source and a first lens constituting the backlight unit.
Figure 4B:
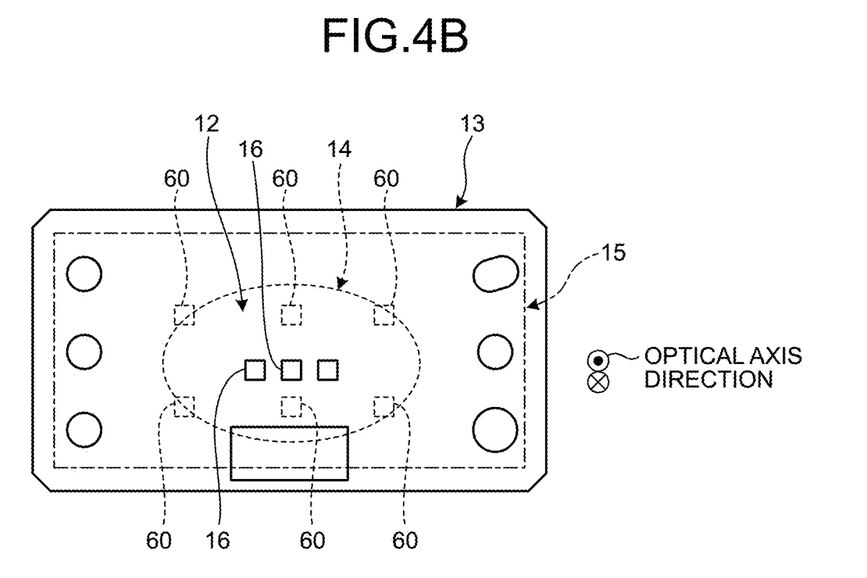
FIG. 4B is a schematic diagram illustrating an arrangement example of the light source viewed from an optical axis direction.

The first lens 14 is arranged on the optical path between the light source 12 and the display device 11, and causes the light incident from the light source 12 to be polarized toward the display device 11. As illustrated in FIG. 3, the first lens 14 is arranged between the light source 12 and the second lens 15 on the optical path between the light source 12 and the display device 11. The first lens 14 is formed of a high refractive index material such as glass or a transparent resin, for example, and functions to refract light traveling toward the outside inward and cause the light to be polarized toward the second lens 15. As illustrated in FIG. 4B, the first lens 14 is formed in an elliptical shape when viewed from the optical axis direction. As illustrated in FIGS. 3 and 4A, the first lens 14 includes an incident surface 14a onto which the light emitted from the light source 12 is incident and an emitting surface 14b from which the light incident onto the incident surface 14a is emitted toward the display device 11.

The incident surface 14a of the first lens 14 faces the light source 12 and is a flat surface. The emitting surface 14b is an opposite surface to the incident surface 14a and faces the second lens 15.

The emitting surface 14b of the first lens 14 is formed of one convex curved surface corresponding to one light source 12. When viewed from a direction orthogonal to the optical axis direction, one mountain portion is formed on the emitting surface 14b instead of forming one or more of valley portions that are formed on the emitting surface of the first lens 40 in the related art. As illustrated in FIGS. 4A and 4B, the emitting surface of the first lens 40 in the related art includes the plurality of mountain portions corresponding to the LEDs 60 that are a plurality of light sources, but the emitting surface 14b of the first lens 14 includes one mountain portion corresponding to one light source 12.

The second lens 15 is arranged between the first lens 14 and the display device 11 on the optical path between the light source 12 and the display device 11, and distributes the light polarized through the first lens 14 toward the display device 11. The second lens 15 is formed of a material such as glass or a transparent resin, for example, and refracts and condenses the light toward the display area 11a of the display device 11. The second lens 15 is fixed to the cylindrical housing 10 by screws or the like. As illustrated in FIG. 4B, the second lens 15 is formed in a rectangular shape when viewed from the optical axis direction. The second lens 15 includes an incident surface 15a onto which the light that has been polarized through the first lens 14 is incident, and an emitting surface 15b which is formed in a convex shape to be curved toward the display device 11 side and through which the light incident on and transmitting through the incident surface 15a is emitted.

The incident surface 15a of the second lens 15 faces the first lens 14, and is a curved surface formed in a convex shape on the first lens 14 side.

Figure 5A:
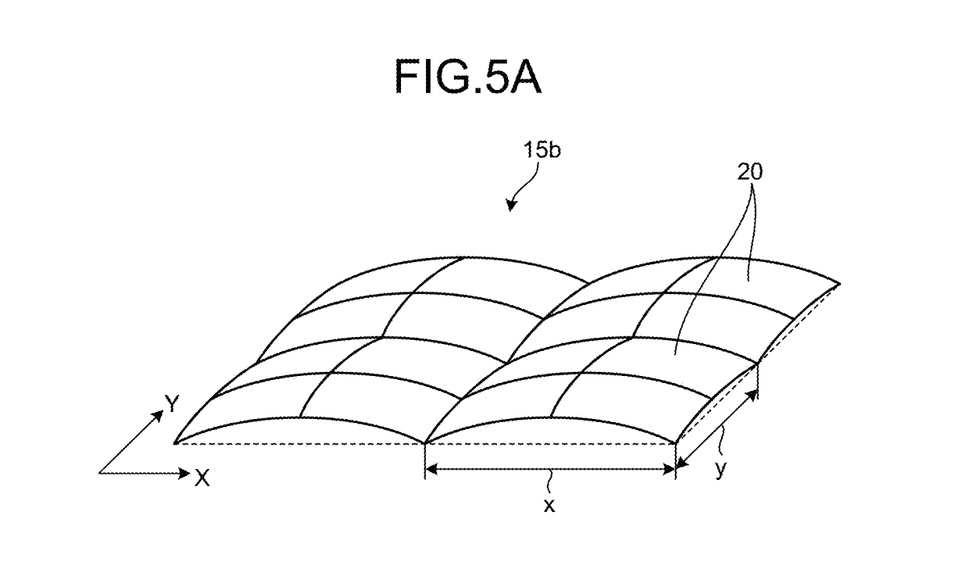
FIG. 5A is a partial perspective view of curved microlens surfaces included in a second lens constituting the backlight unit.
Figure 5B:
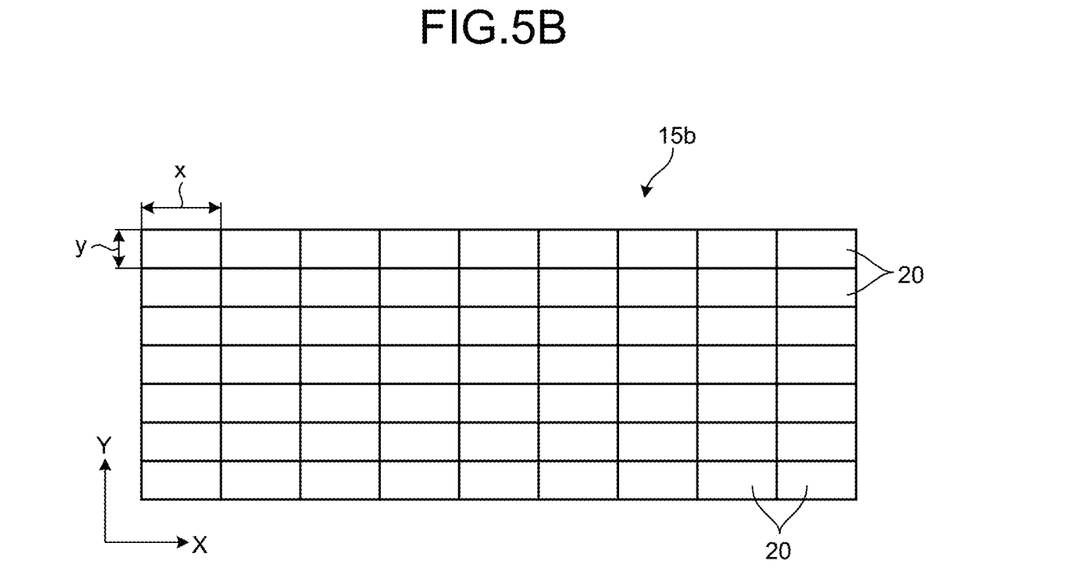
FIG. 5B is a partial front view of the curved microlens surfaces.

The emitting surface 15b of the second lens 15 has a plurality of curved microlens surfaces 20 as illustrated in FIGS. 5A and 5B. Each of the curved microlens surfaces 20 is a so-called curved microlens surface, for example, a fly-eye-shaped lens surface. A plurality of the plurality of curved microlens surfaces 20 are arranged, for example, in a grid pattern along the emitting surface 15b in a convex shape to be curved. As illustrated in FIGS. 5A and 5B, the curved microlens surfaces 20 are arranged on the emitting surface 15b in an X direction and in a Y direction orthogonal to the X direction. Each of the curved microlens surfaces 20 has, for example, a rectangular shape in front view. Each of the curved microlens surfaces 20 has a long side of a length x in the X direction and a short side of a length y (not the same as x) different from the length x in the Y direction. The curved microlens surfaces 20 have, for example, the same length x in the X direction and the same length y (not the same as x) in the Y direction.

As illustrated in FIG. 2, the controller 7 is connected to the backlight unit 5 and controls the backlight unit 5. The controller 7 is composed of, for example, an IC chip or the like mounted on the substrate and is driven by electric power obtained from the battery mounted on the vehicle 100.

Next, a virtual image displaying operation in the vehicle display device 1 will be described with reference to FIGS. 2 and 3. First, the light emitted from the light source 12 is incident onto the incident surface 14a of the first lens 14, transmits through the inside of the first lens 14, and is emitted from the emitting surface 14b. The light emitted from the emitting surface 14b is refracted by the first lens 14 and polarized toward the incident surface 15a of the second lens 15. The light incident onto the incident surface 15a of the second lens 15 transmits through the inside of the second lens 15 and is emitted from the emitting surface 15b. The light emitted from the emitting surface 15b is refracted by the second lens 15, diffused by the curved microlens surfaces 20 that are formed on the emitting surface 15b, and emitted toward the display area 11a of the display device 11. The display device 11 emits the display image displayed on the display area 11a as the display light L by the light transmitted through the inside of the display device 11.

The display light L emitted from the display device 11 of the backlight unit 5 travels toward the plane mirror 8. The plane mirror 8 reflects, toward the concave mirror 9, the display light L incident from the backlight unit 5. The concave mirror 9 reflects, toward the windshield 103, the display light L incident from the plane mirror 8 by the reflecting surface in a concave shape via the transparent cover 6. Therefore, the display image corresponding to the display light L is projected on the windshield 103, and the virtual image S is displayed forward of the eye point EP of the driver D.

In the vehicle display device 1 of the present embodiment, the emitting surface 14b of the first lens 14 is formed of one convex curved surface corresponding to one light source 12. Therefore, it is possible to arrange the light source 12 on the optical axis or the optical axis side of the first lens 14 while ensuring the irradiation of the light over the entire display area 11a of the display device 11. As a result, for example, in a case in which one light emitting element is used as one light source, the size of the light source substrate 13 can be reduced to about 50% of the size of the substrate in the related art. Furthermore, the sizes of the backlight unit 5 and the vehicle display device 1 can be reduced. In the related art, since the light sources are uniformly arranged on the light source substrate for one first lens to make the brightness uniform while expanding the display area, the light source is arranged outside the range referred to as one light source. Thus, the mountain portions are required to be provided on the emitting surface of the first lens. However, the present embodiment is not limited to one light emitting element for one light source, and for example, in a case in which the light emitting elements are used, since the light emitting elements are collectively mounted in the range referred to as one light source, the mountain portions are not required to be provided on the first lens similar to the case in which one light emitting element is used. In addition, since the valley portions are not provided, a change in the brightness of the virtual image S can be reduced and the visibility can be improved.

In the vehicle display device 1, the second lens 15 includes the curved microlens surfaces 20 on the emitting surface 15b. In the related art, in order to cause the display area 11a of the display device 11 to be irradiated with the light of the light source 12, the diffusion lens is arranged on the optical path to diffuse the light, but light loss may occur since the light is transmitted through the diffusion lens. Therefore, the curved microlens surfaces 20 are formed on the emitting surface 15b of the second lens 15, so that the diffusion lens is not required, and a decrease in brightness caused by transmitting the light through the diffusion lens can be suppressed. As a result, the visibility can be improved by at least 10% or more. Since the diffusion lens in the related art is an additional component, the assembly of the additional component can be cut down, and an assembling property of the device can be improved.

Figure 6A:
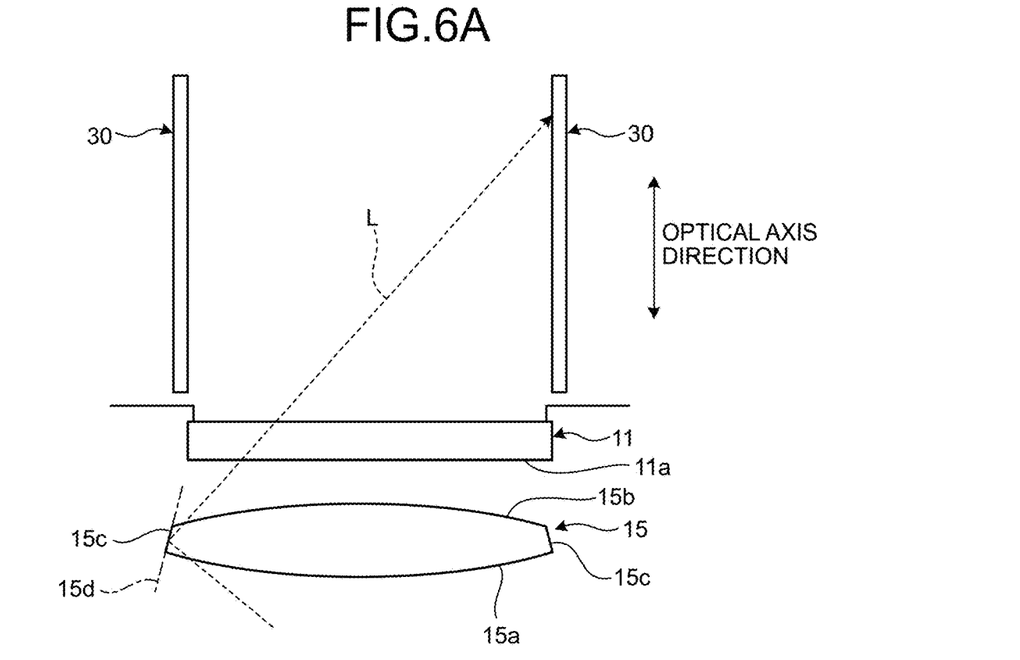
FIG. 6A is a schematic diagram illustrating an optical path of reflected light that is reflected at an end surface of the second lens.
Figure 6B:
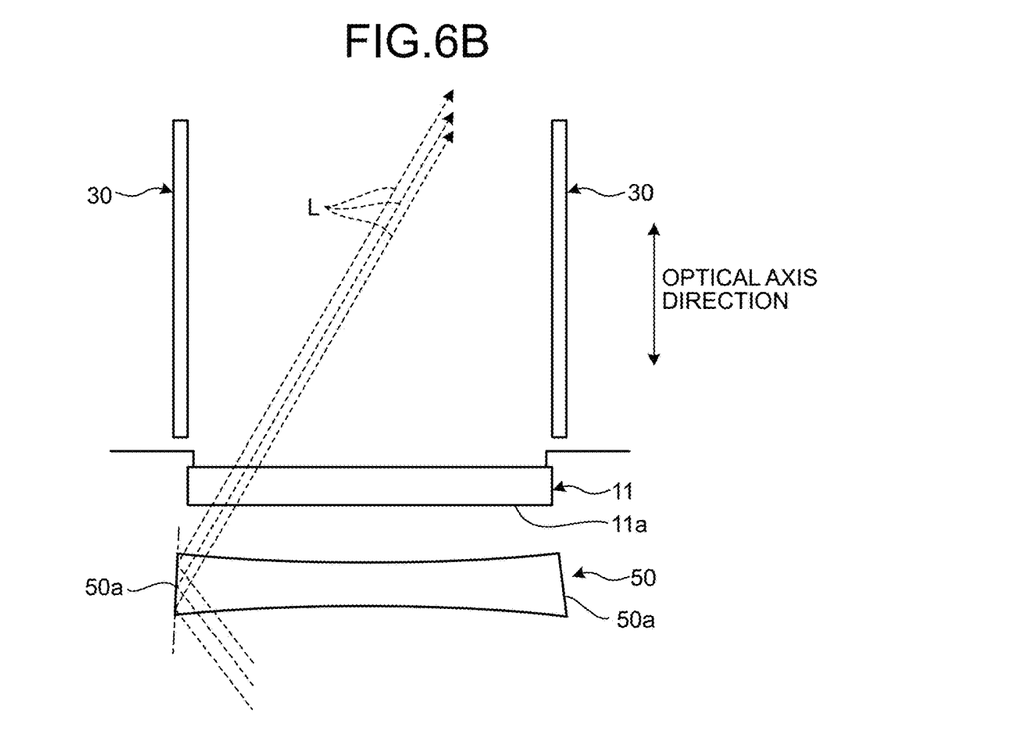
FIG. 6B is a schematic diagram illustrating an optical path of reflected light that is reflected at an end surface of a diffusion lens in the related art.

As illustrated in FIG. 6A, the vehicle display device 1 is formed such that the emitting surface 15b of the second lens 15 is formed in a convex shape to be curved toward the display device 11 side and the incident surface 15a of the second lens 15 is formed in a convex shape to be curved toward the light source 12 side. On the other hand, in the diffusion lens 50 in the related art, illustrated in FIG. 6B, both the incident surface and the emitting surface are formed to be curved in a concave shape. Therefore, areas of both end surfaces 15c in the direction orthogonal to the optical axis direction of the second lens 15 can be reduced as compared with both end surfaces 50a of the diffusion lens 50 in the related art. As a result, reflected light La reflected at both end surfaces 15c of the second lens 15 can be reduced, the reflected light La traveling toward the windshield 103 through a normal optical path formed between the two light-blocking walls 30 can be suppressed, and the visibility of the virtual image S can be improved. By forming an inclination 15d of each of the end surfaces 15c of the second lens 15 so as to incline from the outside toward the inside, the reflected light La reflected by the end surfaces 15c is applied to the light-blocking walls 30 to block the light, and the light passing through other than the normal optical path is reduced to improve the visibility of the virtual image S.

Figure 7A:
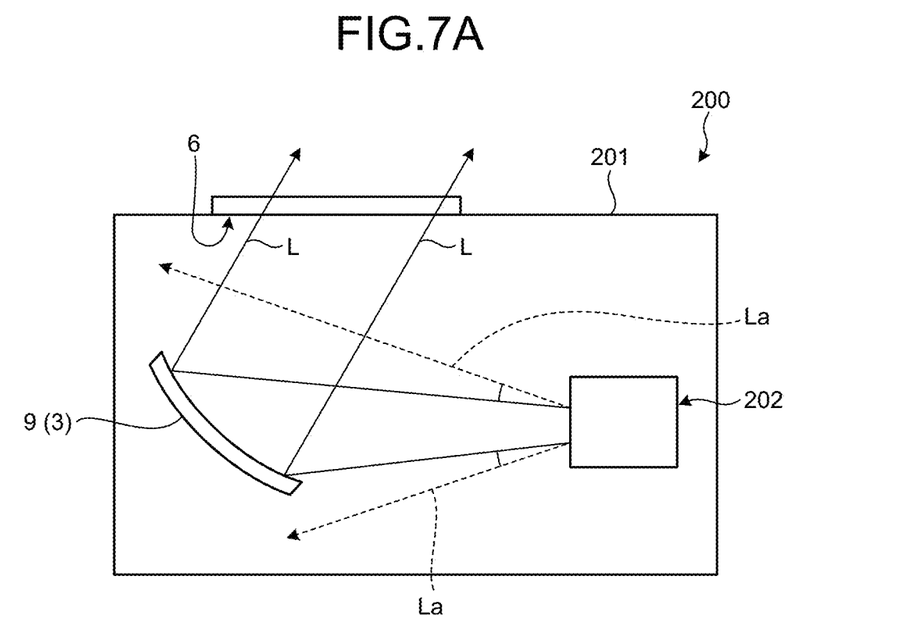
FIG. 7A is a schematic diagram illustrating a schematic configuration example of a vehicle display device in the related art.
Figure 7B:
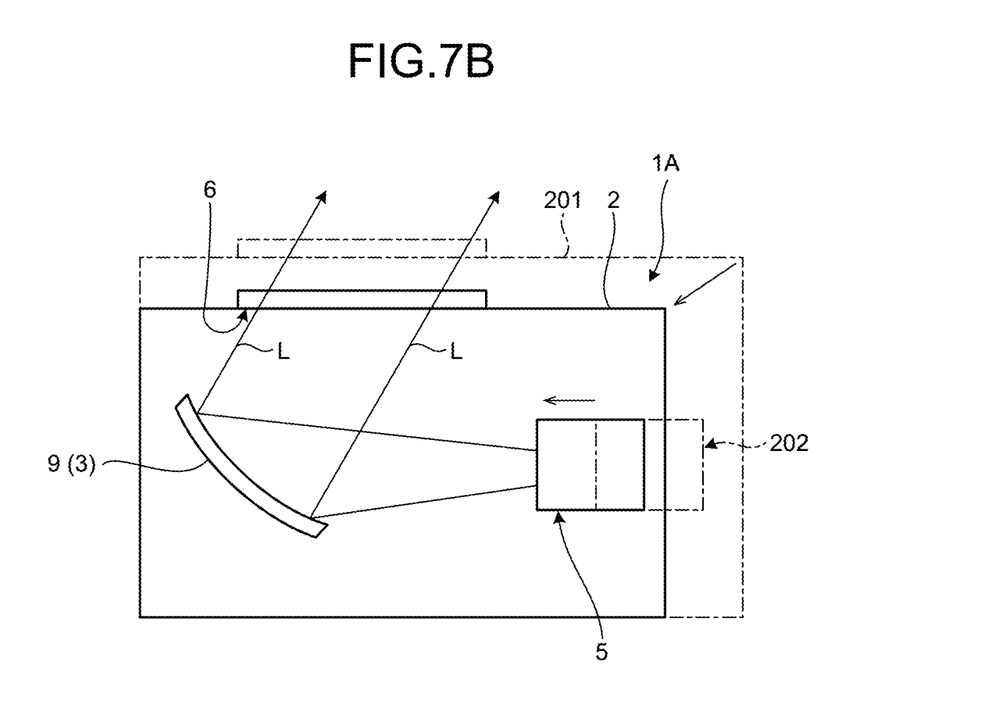
FIG. 7B is a schematic diagram illustrating an example of comparing the vehicle display device in the related art with the vehicle display device to which the embodiment is applied.

Since a backlight unit 202 in the related art, illustrated in FIG. 7A, emits the reflected light La other than the display light L, part of the reflected light La is reflected by the transparent cover 6 to become stray light in a case in which a distance between the backlight unit 202 and the concave mirror 9 is shortened. The stray light is mixed with the display light L via the concave mirror 9, so that the visibility of the virtual image S may deteriorate. By adopting the above configuration, the distance between the backlight unit 202 and the concave mirror 9 can be shortened by the reflected light La being reduced (FIG. 7B). As a result, the housing 2 can be made smaller than a housing 201 of a vehicle display device 200 in the related art.

Figure 8:
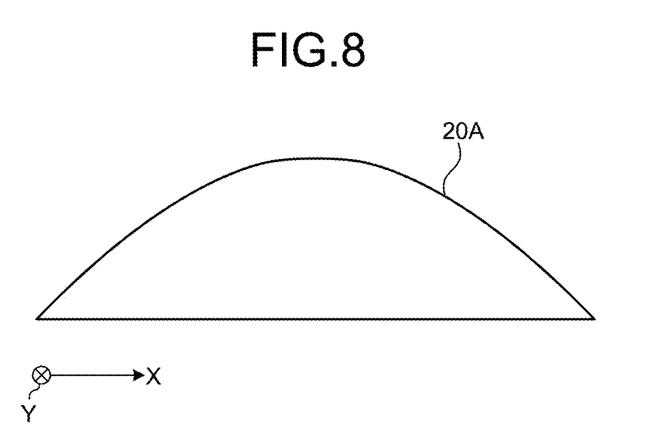
FIG. 8 is a partial side view illustrating an example of an aspherical surface applied to each of the curved microlens surfaces according to a modified example of the embodiment.
Figure 9:
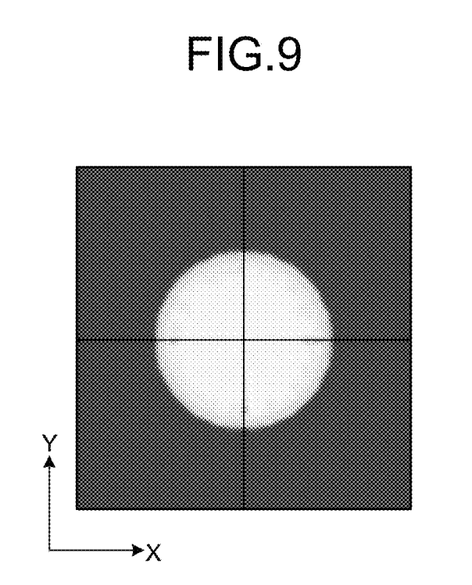
FIG. 9 is a diagram illustrating illuminance distribution by the microlenses according to the modified example of the embodiment.

In the above embodiment, it has been described that the curved microlens surface 20 is a fly-eye-shaped lens surface. In general, the fly-eye-shaped lens includes a spherical lens and a cylindrical lens, but the curved microlens surface 20 is not limited to a spherical surface, and may be an aspherical surface, for example. FIG. 8 is a partial side view illustrating the aspherical surface applied to each of the curved microlens surfaces according to a modified example of the embodiment, and FIG. 9 is a diagram illustrating illuminance distribution by the aspherical microlenses. A curved microlens surface 20A according to a modified example of the embodiment is the aspherical surface that diffuses light substantially uniformly so as to suppress brightness unevenness (FIGS. 8 and 9). The shape of the aspherical surface is designed according to the geometrical arrangement and the shape of the optical system in the device. As long as the shape satisfies the above description, the shape of each of the curved microlens surfaces 20A viewed from the direction orthogonal to the optical axis direction may be either a symmetrical shape or an asymmetrical shape. In addition, as long as the shape satisfies the above description, a lens height in a case in which each of the curved microlens surfaces 20 is the aspherical surface may be higher or may be lower than a lens height in a case in which each of the curved microlens surfaces 20 is the spherical surface. Furthermore, as long as it is possible to uniformly diffuse the light so that the brightness unevenness is suppressed over the entire second lens 15, all of the curved microlens surfaces 20A may be aspherical surfaces having the same shape or may be aspherical surfaces having a different shape from each other. Since the curved microlens surfaces 20A are thus the aspherical surfaces, the light emitted from the emitting surface 15b of the second lens 15 toward the display device 11 can be efficiently diffused, and local condensation of the light is suppressed, the brightness unevenness of the display image can be suppressed. As a result, in the vehicle display device 1 according to the modified example of the present embodiment, the visibility of the virtual image S displayed on a front field of the driver D can be improved.

In the above embodiment, the backlight unit 5 adopts a liquid crystal display system, but may adopt another system, for example, a laser system, a digital light processing (DLP) system, or a projector system.

In the above embodiment, the controller 7 may be connected to an electronic control unit (ECU) (not illustrated) mounted on the vehicle 100, and may transmit and receive a signal to and from the ECU.

In addition, in the above embodiment, the vehicle display device 1 includes two reflecting mirrors 3, but the present embodiment is not limited thereto. For example, as in a vehicle display device 1A illustrated in FIG. 7B, one reflecting mirror 3 (concave mirror 9) may be included. Alternatively, three or more reflecting mirrors 3 may be included. The plane mirror 8 may be a concave mirror, or may be, for example, a convex mirror, an aspherical mirror, a spherical mirror, a free curved mirror, and the like. The concave mirror 9 may be, for example, a convex mirror, an aspherical mirror, a spherical mirror, a free curved mirror, and the like. In addition, the concave mirror 9 has a function as the magnifying mirror, but the present embodiment is not limited thereto, and may have a function as a correcting mirror.

In the above embodiment, each of the vehicle display devices 1 and 1A projects the display image on the windshield 103 of the vehicle 100, but the present embodiment is not limited thereto, and each of the vehicle display devices 1 and 1A may project the display image on, for example, a combiner or the like.

In the above embodiment, each of the vehicle display devices 1 and 1A is applied to the vehicle 100 such as an automobile, but the present embodiment is not limited thereto, and may be applied to, for example, a ship or an aircraft other than the vehicle 100.

The vehicle display device according to the present embodiment exerts an effect of enabling improvement in the visibility of a virtual image displayed on a front field of the driver.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
   one light source at a location;
   a display device that emits, as display light, a display image projected on a projected member provided on a vehicle by light incident from the light source;
   a first lens arranged on an optical path between the light source and the display device, and causing the light incident from the light source to be polarized and emitted onto the display device; and a second lens arranged between the first lens and the display device on the optical path, and distributing the light polarized through the first lens toward the display device, wherein the first lens includes an emitting surface that emits light toward the display device, the emitting surface of the first lens is formed of one convex curved surface that has an optical axis that passes through the location of the one light source, the second lens includes:

an incident surface onto which the light polarized through the first lens is incident; and     an emitting surface which has a curved shape and faces toward the display device and through which the light incident on and transmitting through the incident surface is emitted, the emitting surface of the second lens includes a plurality of curved microlens surfaces arranged along a convex path.

2. The vehicle display device according to claim 1, wherein the incident surface of the second lens is formed in a convex shape and faces toward the light source.

3. The vehicle display device according to claim 1, wherein each of the curved microlens surfaces is an aspherical surface.

4. The vehicle display device according to claim 2, wherein each of the curved microlens surfaces is an aspherical surface.

* * * * *